(No Model.)
R. S. PARKS & J. F. SHELLEY.
NUT LOCK.
No. 597,737. Patented Jan. 25, 1898.
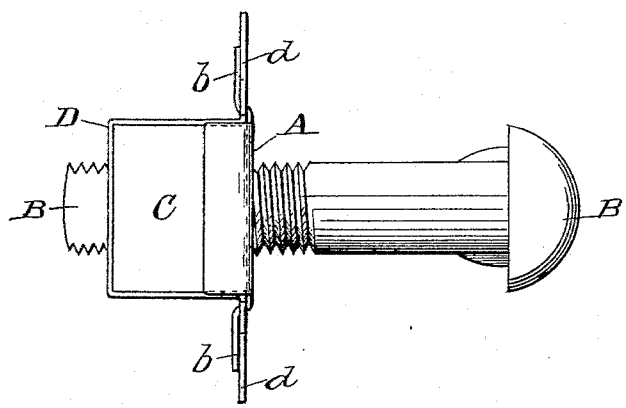
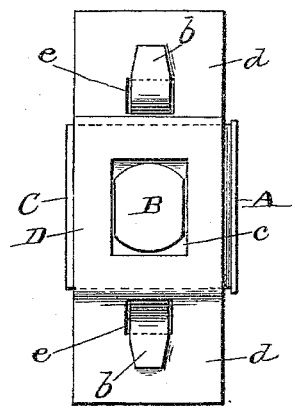
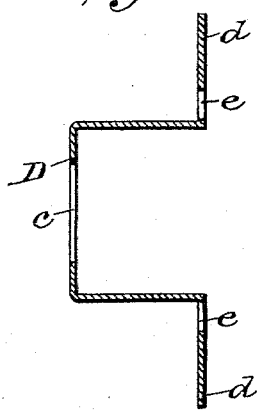
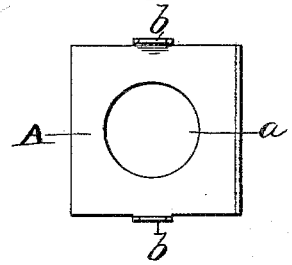
Witnesses
Jos. H. Blackwood
Hartwell P. Heath
Inventors:
Robert Scott Parks
James F. Shelley
by D. A. Gourick
Attorney

UNITED STATES PATENT OFFICE.

ROBERT SCOTT PARKS AND JAMES F. SHELLEY, OF SCOTTSBOROUGH, ALABAMA.

NUT-LOCK.

SPECIFICATION forming part of Letters Patent No. 597,737, dated January 25, 1898.

Application filed May 1, 1897. Serial No. 634,751. (No model.)

*To all whom it may concern:*

Be it known that we, ROBERT SCOTT PARKS and JAMES FRANK SHELLEY, citizens of the United States, residing at Scottsborough, in the county of Jackson and State of Alabama, have invented certain new and useful Improvements in Nut-Lock Washers, of which the following is a specification.

Our invention relates to improvements in nut-lock washers, and has for one of its objects to provide a cheap and simple but durable means of locking a nut on the bolt so that it cannot work loose.

Another object of our invention is to provide a nut-lock washer that may be used on any nut and bolt, that is easily and quickly attached, and as easily and quickly detached.

Another object of our invention is to provide a nut-lock washer having the part subjected to the strain made rigid, if desirable, and in all cases forming the strongest part of the device instead of, as in many nut-locking devices, being the smallest and weakest part.

Another object of our invention is to provide a nut-locking device that may be made the ornamental finish to the ends of bolts secured by nuts, rounding off and hiding all rough edges and at the same time effectually locking the nut on the bolt.

These objects we accomplish in the manner and by the means hereinafter more fully described in detail, and particularly pointed out in the claims, reference being had to the accompanying drawings, in which like reference-letters indicate like parts in all the figures.

Figure 1 is a view of our invention in use. Fig. 2 is a detail view of the cap. Figs. 3 and 4 are detail views of the base, washer, and locking device and cap.

Our invention consists of a washer A, having a hole $a$ in its center large enough to admit the passage of the bolt B, and tongues $b$ $b$, extending from two of its sides, one or both of the other sides of said washer A being turned up, if desired, at right angles to form a seat for the nut C, and a cap D, having in its center a rectangular hole $c$, adapted to receive the end of the bolt B and bind against two sides of the end of said bolt B, said end on two sides having been cut or filed so as to present parallel flat surfaces. The cap D is bent down at each side at right angles to fit over the nut C and cover two of the sides of said nut C and at the level of the bottom of said nut C again bent outward at right angles, forming the flanges $d$ $d$, and having at the junction of said flanges $d$ $d$ and the sides of said cap D slots $e$ $e$.

To use our device, the washer A is first put over the bolt B, the nut C screwed into place, the cap D put over the nut C, the end of the bolt B having had its two sides first cut or filed down, and the tongues $b$ $b$ passed through the slots $e$ $e$ and turned down on the flanges $d$ $d$, securely locking the nut and preventing the moving of said nut C.

It will be observed that the strain comes against the sides of the cap D, which are as broad as the sides of the nut C and may be made rigid, if desired, the whole cap being cast solid.

The tongues $b$ $b$, which in many nut-locking devices bear the strain, serve here only to lock the cap D down.

The cap D may be cast solid with four sides, from two of which the flanges $d$ $d$ project, and if furnished with an oval cap rising from the sides of the hole $c$, through which the end of the bolt B passes, will serve as a finish for the ends of bolts, rods, &c., secured by nuts.

Having thus described our invention, what we claim as new, and desire to secure by Letters Patent, is—

1. In a nut-locking device, a cap having in the center of its top a rectangular hole adapted to receive the end of the bolt and bind against two flattened sides of the end of said bolt, said cap passing down along two opposite sides of the nut and at the level of the bottom of the nut bent outward at right angles, slots at the junction of said sides and said flanges, and means engaging said slots for holding said cap in position, substantially as shown and described.

2. In a nut-locking device, a cap having in the center of its top a rectangular hole adapted to receive the end of the bolt and bind against two flattened sides of the end of said bolt, said cap passing down along the sides of said nut and having two of its sides at the level of the bottom of said nut bent outward at right angles, slots at the junction of said two sides and said flanges, and means engaging said slots for holding said cap in position, substantially as shown and described.

3. A nut-lock washer consisting of a washer having in its center a hole for the passage of the bolt, tongues extending from two of the sides of said washer, and a cap having in the center of its top a rectangular hole to receive the end of the bolt and bind against two flattened sides of the end of said bolt, and extending down along two opposite sides of said nut and at the level of the bottom of said nut bent outward at right angles, slots in the bends at the bottom of said sides of said cap to receive said tongues, substantially as shown and described.

4. A nut-lock washer consisting of a washer having in its center a hole for the passage of the bolt, tongues extending from two of the sides of said washer and one or more of its other sides turned up at right angles forming a seat for the nut and a cap having in the center of its top a rectangular hole to receive the end of the bolt and bind against two flattened sides of the end of said bolt, and extending down along two opposite sides of said nut and at the level of the bottom of said nut bent outward at right angles, slots in the bends at the bottom of said sides of said cap to receive said tongues, substantially as shown and described.

In testimony whereof we hereto affix our signatures in the presence of two witnesses.

ROBERT SCOTT PARKS.
JAMES F. SHELLEY.

Witnesses as to signature of Robert Scott Parks:
T. J. KENNAMER,
ELBERT HAYS.

Witnesses as to signature of James F. Shelley:
WM. B. BRIDGES,
JAS. B. HACKWORTH.